Feb. 5, 1924.
F. A. OST
1,482,862
MACHINE FOR MOLDING AND BAKING PASTRY CONES
Filed Dec. 18, 1919
6 Sheets-Sheet 1
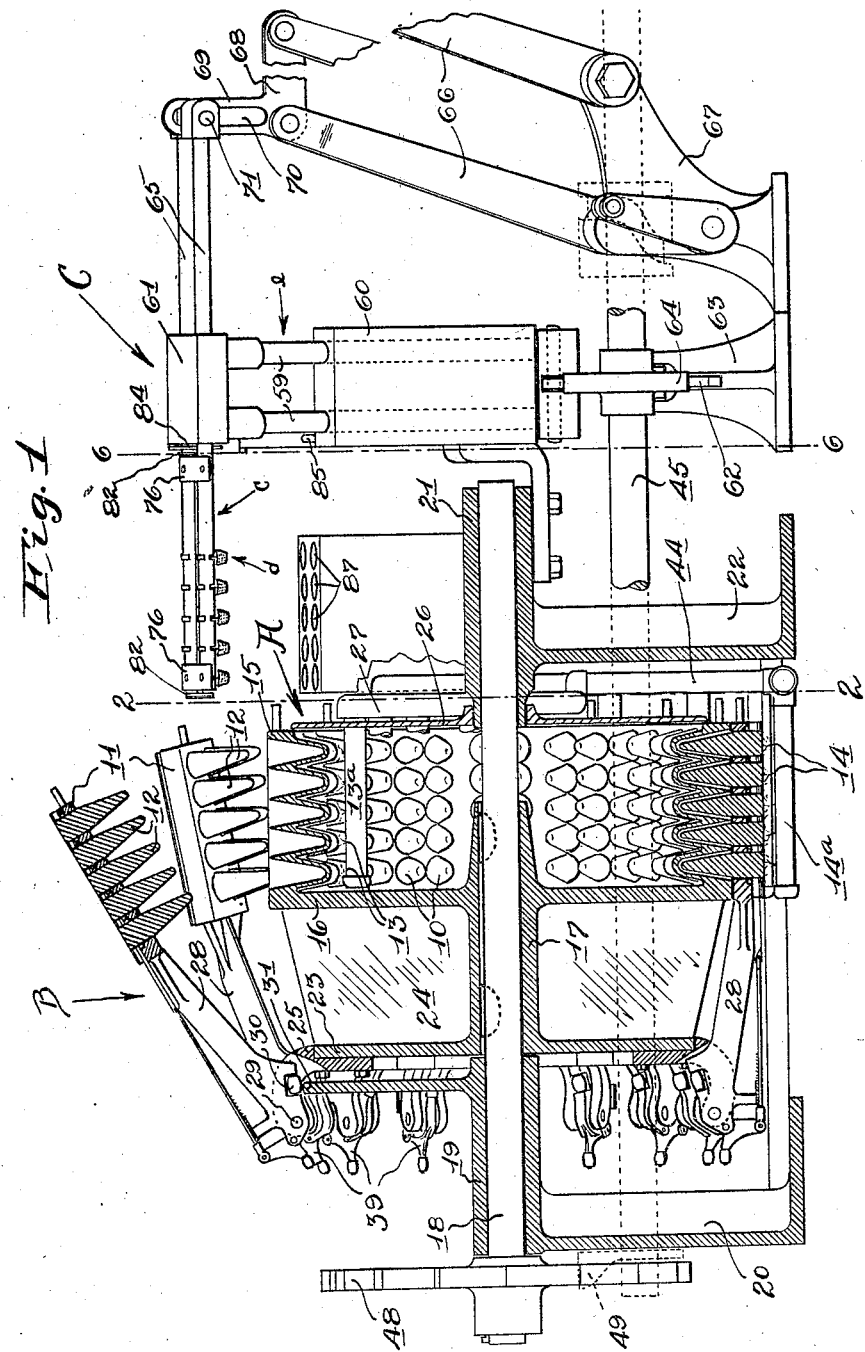
Inventor
Frederick A. Ost
By Bradbury & Caswell
Attorneys

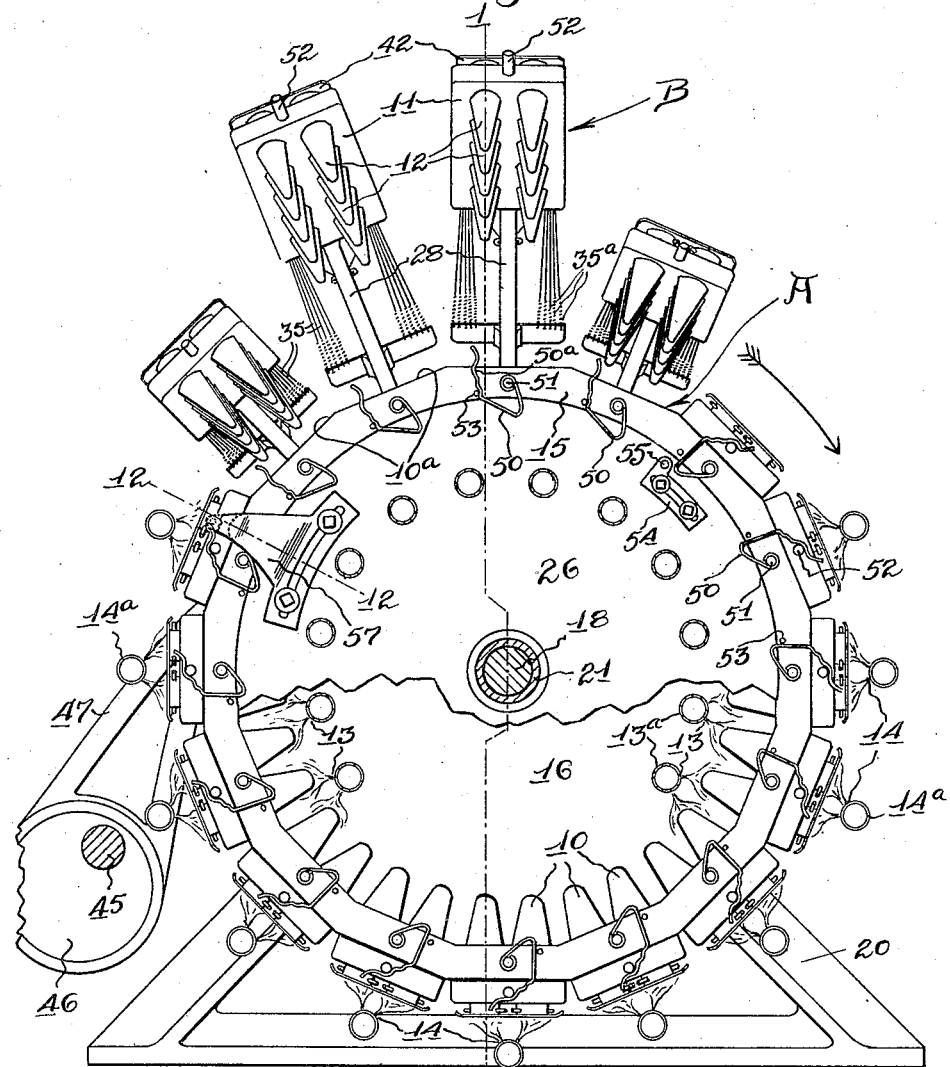

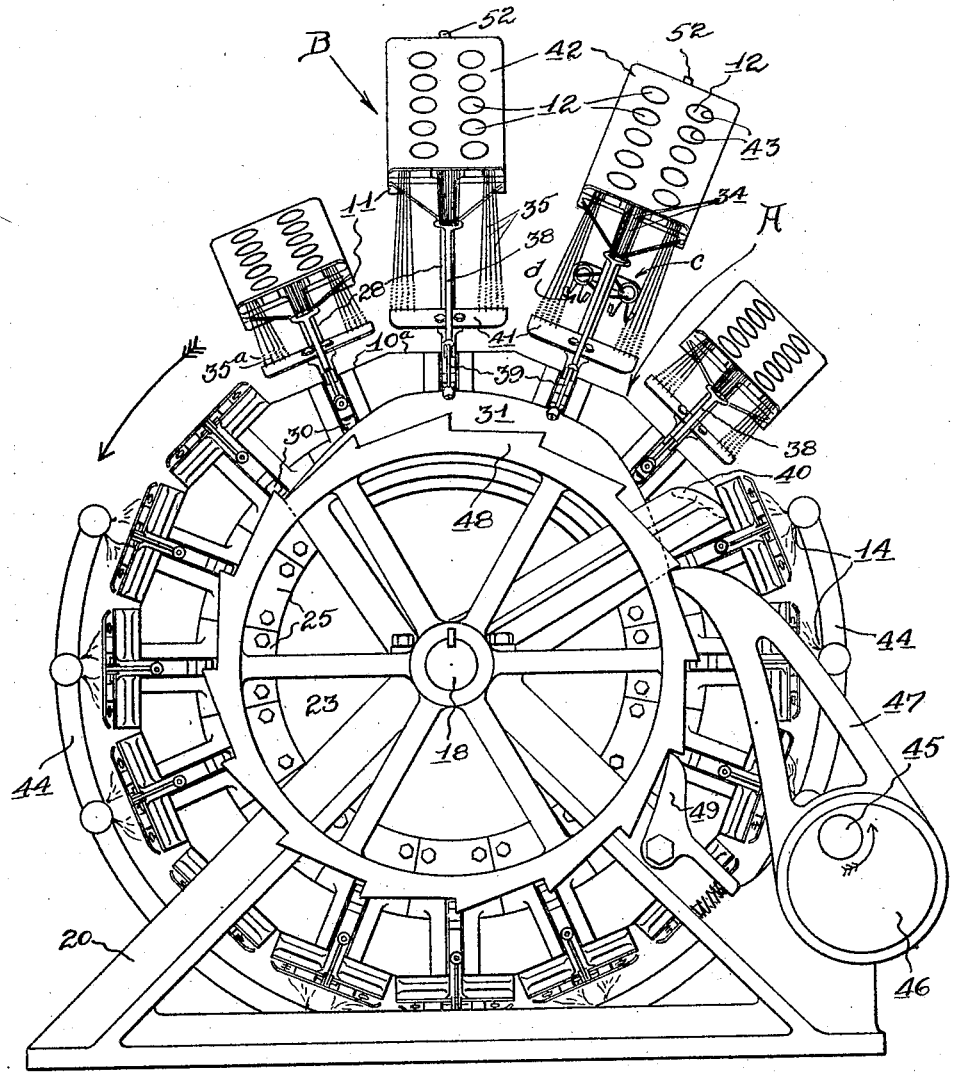

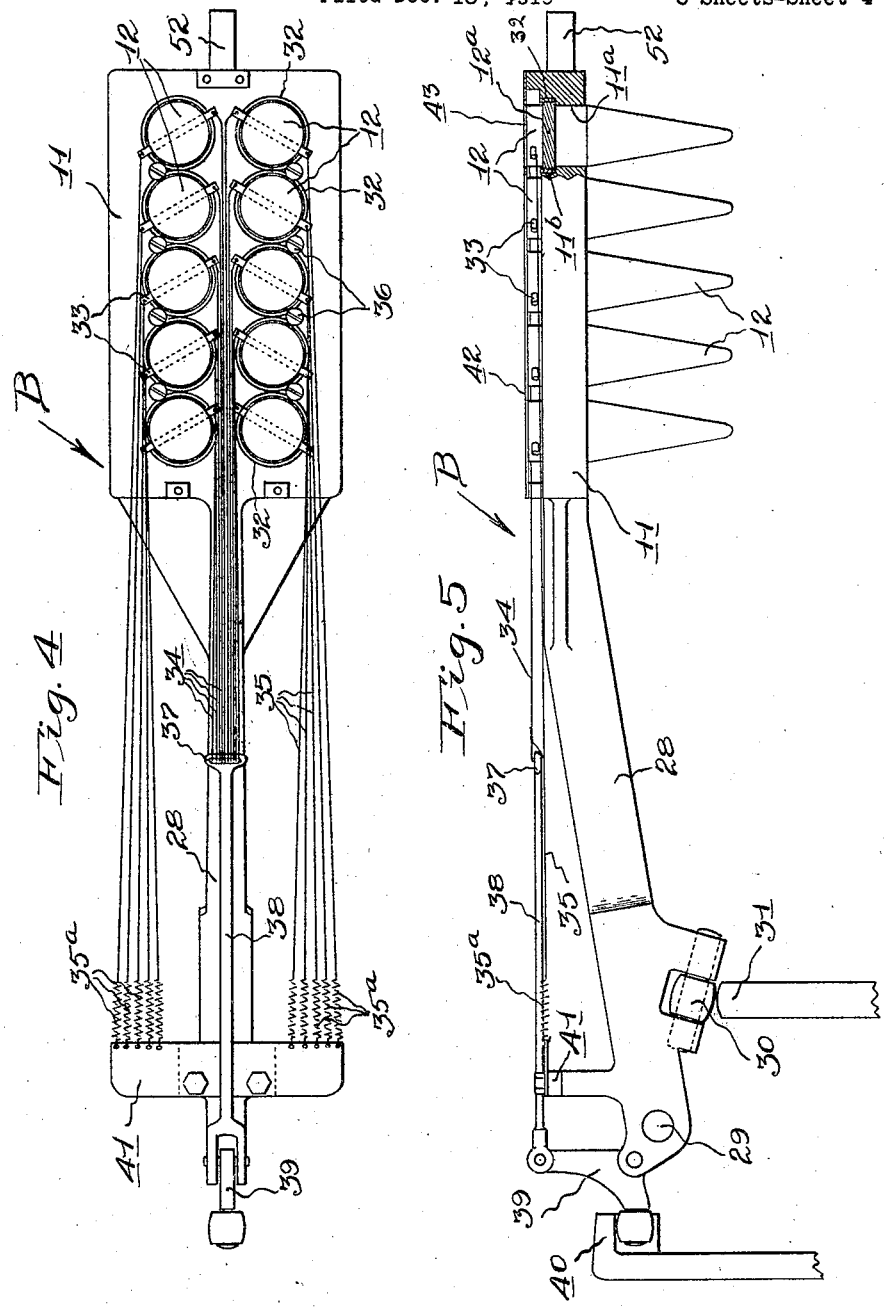

Feb. 5, 1924.
F. A. OST
1,482,862
MACHINE FOR MOLDING AND BAKING PASTRY CONES
Filed Dec. 18, 1919     6 Sheets-Sheet 5
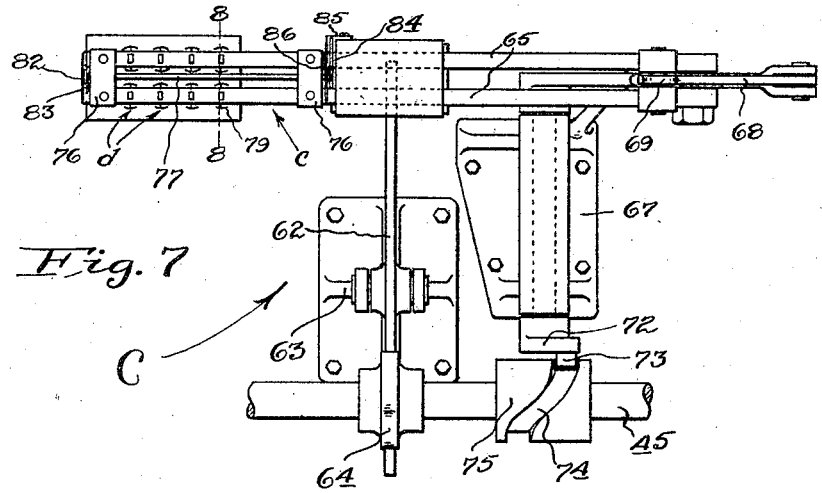
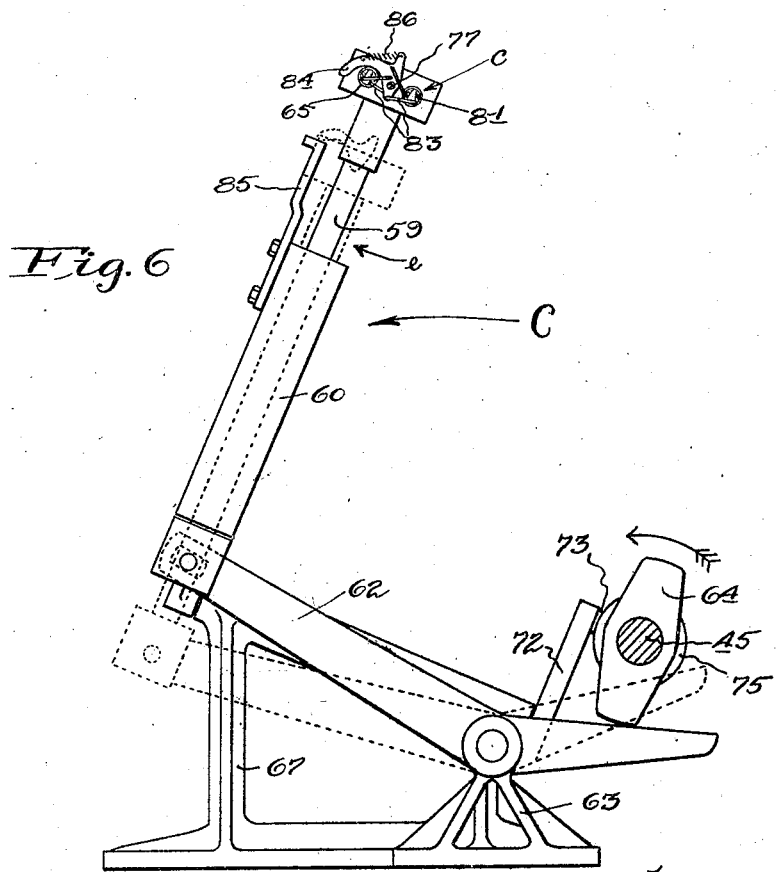
Inventor
Frederick A. Ost
By Bradbury & Caswell
Attorneys Feb. 5, 1924.
F. A. OST
MACHINE FOR MOLDING AND BAKING PASTRY CONES
Filed Dec. 18, 1919
1,482,862
6 Sheets-Sheet 6
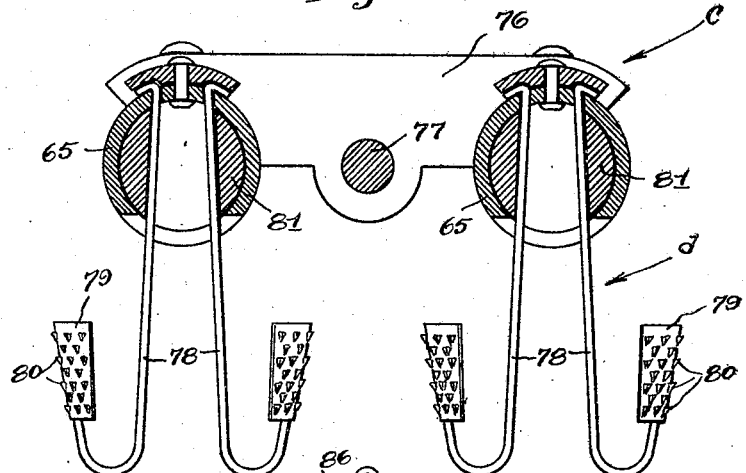
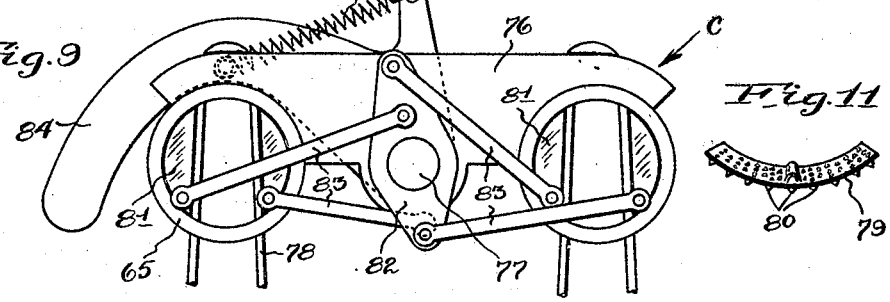
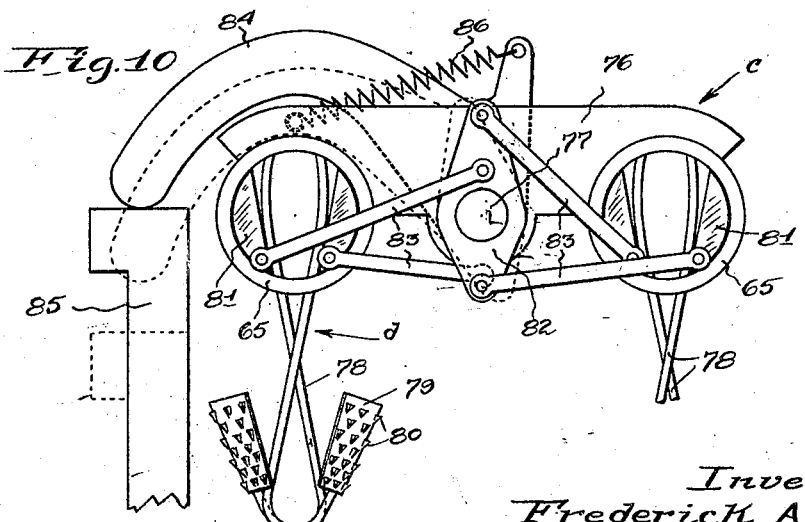
Inventor
Frederick A. Ost
By Bradbury + Caswell
Attorneys Patented Feb. 5, 1924.

1,482,862

UNITED STATES PATENT OFFICE.

FREDERICK A. OST, OF MINNEAPOLIS, MINNESOTA, ASSIGNOR, BY MESNE ASSIGNMENTS, OF FORTY-NINE FIFTIETHS TO L. F. YOUNG, OF ST. PAUL, MINNESOTA.

MACHINE FOR MOLDING AND BAKING PASTRY CONES.

Application filed December 18, 1919. Serial No. 345,792.

*To all whom it may concern:*

Be it known that I, FREDERICK A. OST, a citizen of the United States, residing at Minneapolis, in the county of Hennepin and State of Minnesota, have invented a new and useful Machine for Molding and Baking Pastry Cones, of which the following is a specification.

My invention relates to improvements in machines for molding and baking pastry cones.

Its object is to provide a durable and efficient machine of this kind having large capacity and being relatively simple and inexpensive in construction.

A further object is to provide a machine of this kind having molds and cores cooperating therewith, the latter being subjected to distinct releasing movements to overcome the sticking of the baked pastry against the molds and cores.

A further object is to supply a device of this kind in such form that the baking heat is applied with maximum efficiency, thereby conserving in the expenditure of heat and at the same time increasing the productive capacity of the machine.

A further object is to provide a device of the class described, including novel and efficient mechanism for extracting baked pastry therefrom without injury to the pastry.

With the foregoing and other objects in view, which will appear in the following description, the invention resides in the novel combination and arrangement of parts and in the details of construction hereinafter described and claimed.

In the drawings Fig. 1 is a side elevation of a machine embodying my invention, a portion thereof being shown in section, as on the line 1—1 of Fig. 2, to disclose otherwise concealed parts; Fig. 2 is a sectional view taken on the line 2—2 of Fig. 1, a portion thereof being broken away to show the interior of the drum-like oven; Fig. 3 is an end elevation of the machine; Fig. 4 is a plan view in detail of one of the core plates and its supporting arm and shows the individual actuating devices for turning the cores within said plates; Fig. 5 is a side view thereof, a portion of the core plate being broken away to illustrate the manner in which the cores are mounted in the core plate; Fig. 6 is a sectional view taken on the line 6—6 of Fig. 1 and illustrates in elevation the major part of the extracting mechanism; Fig. 7 is a plan view of said extracting mechanism; Fig. 8 is an enlarged sectional view taken on the line 8—8 of Fig. 7 and illustrates the carrier of the extractor together with a pair of grips thereon and actuating segments for said grips; Figs. 9 and 10 are similar views showing the end of said carrier and different positions assumed by the members of each grip; Fig. 11 is a perspective view illustrative of the gripping plates embodied in each grip and Fig. 12 is an enlarged sectional view in detail taken on the line 12—12 of Fig. 2.

Referring to the drawings, it will be seen that the machine illustrated as an embodiment of my invention, includes a vertically revoluble drum or oven A having molds 10 in the periphery thereof, oscillatory supports B revoluble with the oven and terminating in core plates 11 carrying cores 12, which register with the molds in the oven A, burners 13 within the oven for heating the molds, burners 14 outside of the oven for heating the cores and an extractor C including a carrier $c$ having grips $d$ thereon adapted to remove baked articles from the molds 10 in the oven A.

The oven A includes a rim 15 and a web 16 supplied with a bearing 17 at the center thereof. Said bearing 17 receives and is fixed to a horizontal driving shaft 18 mounted at one end in a journal 19 on a frame 20 and at the other end in a journal 21 on a frame 22. A flange 23 integral with the bearing 17 and reinforced by ribs 24 carries brackets 25 at the periphery thereof in which the oscillatory supports B are pivoted. Cups or molds 10 formed in the rim 15 of the oven, open in groups or batteries of ten, at flattened surfaces or seats 10ª formed upon the outer periphery of the rim 15. The side of the drum opposite the web 16 is closed by a stationary plate 26 fixed upon the end of the journal 21. Gas ducts 13ª forming burners 13, within the drum, pass horizontally through said plate 26 and connect with a gas manifold 27 adjacent thereto. The drum A is turned, step by step, as will hereinafter appear, and said gas ducts are so placed that flames from the burners 13 will play directly upon the molds 10 at each dwell of the drum.

Each bracket 35 on the flange 23 carries an oscillatory support B comprising an arm 28 and a core plate 11 at the free end of said arm. A pin 29 passing through each arm 28 and its respective bracket 25 forms a mounting for the arm and a roller 30 on the arm, so placed as to ride upon a cam 31, shifts said arm to raise the core plate 11 from its seat 10ª upon the drum and restore said core plate against its seat after the extraction of baked articles from the molds and the recharging of said molds with pastry batter. Each core plate 11 carries a battery of cores 12 arranged to enter its corresponding battery of molds within the drum and form a number of hollow pastry cones. Each core 12 has a cylindrical head and a depending conical portion, the latter being designed to register with a mold, while the head is adapted to fit loosely in a bore 11ª in its supporting core plate 11. An annular enlargement 12ª on the head of the core is threaded to fit an internally threaded bushing 32 loosely seated in an enlargement 11ᵇ of the bore 11ª receiving said core. A pin 33 passing through the upper end of the head of the core 12 provides means of attachment for wires 34 and 35 which are pulled to turn the cores in opposite directions. Said bushing is secured to the core plate by clamping screws 36 in such angular relation with respect to the core 12 that the annular enlargement 12ª upon the core is seated against said core plate, when the pin 33 in the core reaches a predetermined angular position, as a result of a pull upon the wire 35. The cores 12 in each core plate 11 are arranged in two parallel rows, to correspond with the molds 10 in the oven A. The threads in the cores in one row are opposed to the threads in the cores of the other row. The wires 34 for turning the cores to raise and unseat the same pass from the pins 33 in said cores to an eye 37 in a rod 38 above the supporting arm. This rod is attached to one end of a bell-crank 39 pivoted on the arm 28, the other end of said bell-crank being arranged to ride beneath a cam 40. Said cam is designed to shift the bell crank 39 and thereby cause the rod 38 to pull the wires 34 and simultaneously lift the cores in the core plates, through the turning action of said cores. The wires 35 for lowering and reseating the cores 12 within the plate are attached to the ends of the pins 33 opposite to the points of connection with said wires 34. Each wire 35 terminates in a tension spring 35ª, which is attached to a cross-bar 41 on an arm 28 and said springs operate individually in turning and reseating their respective cores, in the absence of resistance from the opposing wires 34. Guards 42 on the core plates 11, to protect the wires 34 and 35, are formed with openings 43 therein to register with and expose the ends of the cores 12. Horizontal gas ducts 14ª forming burners 14 communicate with a gas manifold 44 and are arranged at intervals outside of the drum in such positions as to direct the flames from said burners against the ends of the cores in molding positions, at each dwell of the drum. The inner series of burners 13 and the outer series of burners 14 overlap so that one member of each baking element is at all times directly heated. A power shaft 45, parallel with the drive shaft 18, is journaled near one end in the frame 20 and is supplied at said end with an eccentric 46. A dog 47 reciprocated by this eccentric engages the teeth of a ratchet wheel 48 on the drive shaft 18 and turns said shaft, step by step. A spring pressed dog 49 on the frame 20 also engages the teeth of said ratchet wheel and prevents said wheel from turning backward.

Referring to Fig. 2, it will be seen that the cam 31 lifts the core plates 11 and removes the cores 12 from their corresponding molds as said molds approach vertical position at the top of the drum. This removal of the cores from the molds permits the extraction of the baked pastry therefrom prior to the step carrying said molds into vertical positions, wherein they are charged with pastry batter. Upon further rotation of the drum and after the molds are recharged by any suitable means, the core plates 11 are lowered by gravity and regulated in such movement by the cam 31. The reseating of the core plates 11 against the drum completes registration between the cores and molds, which together form the baking receptacles for the pastry articles during the remainder of the cycle of said drum. I supply clips 50 to secure the core plates 11 against the seats 10ª upon the drum and thereby prevent the arms 28 from swinging downward when the core plates reach positions below the axis of the drum. These clips each comprise a spring bar first bent around and pivoted upon a pin 51 in the drum, thence extended inwardly and thence outwardly a sufficient distance to reach beyond a pin 52 in the end of the core plate 11. Near the free end of said bar is a recess or catch 50ª adapted to receive and engage said pin 52 and the extremity of said free end is turned back slightly to strike an obstruction, as will soon appear, and thereby release said catch from said pin, preparatory to the removal of the core plate 11 from the drum A. A stop-pin 53 fixed in the drum at a point near the pin 51, upon which the clip is pivoted, limits the tilting movement of said clip after the same has been released from the pin 52 on the core plate. Projecting from a block 54 adjustably mounted on the plate 26, which closes the open side of the drum A, is a stud 55, said stud being arranged in the path of the inwardly projecting portions of the clips 50 and at a point to strike said clips as their respective core plates 11 are returned to position against the drum A. As the drum turns, this stud 55 engages the passing clips and causes the catches 50ª thereon to embrace their respective pins 52 on the core plates 11, thus locking said plates in molding position.

Referring to Figs. 2 and 12, it will be noted that the obstruction above mentioned, which strikes the ends of the clips 50 and removes said clips from engagement with the pins 52 in the core plates 11, comprises a stud 56, mounted in a bracket 57 adjustably secured upon the face of the closure 26. This bracket 57 also has a cam 58 thereon, said cam lying in the path of the pins 52 in the core plates 11 and adapted, after the core plates are released, to slightly raise said plates and then permit the return thereof against the rim 15 of the drum A. This temporary displacement of the core plates 11 effects a releasing movement of the cores within their respective molds.

The various stages and operations in the formation of cones may be best traced by beginning with a battery of molds at the top of the drum or, in other words, in charging position. Reference still being had to Fig. 2, it will be noted that the upper battery of molds rest in vertical position to receive charges of pastry batter. The corresponding core plate 11 is elevated considerably and furnishes ample working room between the cores 12 and the molds 10. The drum A being rotated, step by step, in a clockwise direction as seen in said Fig. 2, it will be understood that the core plate to which attention is now directed, is lowered by gravity under the control of the cam 31, to position against its seat 10ª on the periphery of the drum. At this stage, the inwardly projecting end of the clip 50 strikes the stud 55, said stud causing the outer end of said clip to pass over the pin 52 in the core plate, the recess 50ª in the clip engaging the pin, thus securing the core plate in position upon the drum and preventing the same from falling by gravity, upon reaching positions beneath the axis of the drum. The burners 13 within the drum and the burners 14 outside of the drum respectively heat the molds 10 and cores 12. Upon reaching a point adjacent to the bracket 57 on the closure 26, the baking of the pastry articles within the molds is complete. The stud 56 in said bracket first disengages the clip 50 from the pin 52 on the core plate, said clip tilting backward against its stop pin 53. Following the release of the core plate, the pin 52 on said plate strikes the cam 58 on the bracket 57, said cam operating to slightly lift the core plate from the drum, then permit the return thereof to said drum. This temporary withdrawal of the cores from the molds, as proven in practice, uniformly effects a releasing movement between the baked pastry articles and the molds 10. Continuing, the cam 40, through the bellcrank 39, causes a rearward movement of the rod 38, resulting in a pull upon the wires 34 and a consequent turning and lifting movement of the cores 12 within the core plate 11. This action of the cores effects a releasing movement between the same and the baked pastry articles. An important feature to be noted at this stage, resides in the reinforcement afforded by the molds and cores to the baked articles, during the act of overcoming the sticking of the baked articles against the cores. These articles, being firmly supported at all points, both within and without, withstand the initial turning movements of the cores without breaking or tearing. Following the releasing movement of the cores 12, the cam 31 contacts with the roller 30 on the arm 28 and lifts the core plate 11 from the drum. During the elevation of said core plate, the bell-crank 39 is disengaged from the cam 40. The springs 35ª then pull upon the wires 35, thus turning the cores 12 and individually reseating the same in the core plate 11. The provision of separate means to thus turn each core, insures the production of cones of uniform thickness and uniformity in the baking thereof. When the battery of molds reaches the position next adjacent to that at which the molds are to be recharged and a new cycle commenced, the baked cones are removed therefrom by the extractor C.

The extractor C comprises a carrier $c$ with grips $d$ thereon and an elevator $e$ to raise and lower the carrier and thus direct said grips to receiving and discharging positions. The elevator $e$ includes two plunger rods 59, slidable in a bearing 60, said rods being supplied with a horizontal double bearing 61 at their upper ends and being connected at their lower ends with a lever 62 fulcrumed on a frame 63. A cam 64 on the power shaft 45, riding upon the end of the lever 62, opposite said plunger rods 69 causes the reciprocation of said rods. The carrier $c$ includes two tubular arms 65, slidably mounted in said double bearing 61. Mechanism is provided to shift said arms longitudinally and at the same time permit said arms to be raised and lowered by the elevator $e$. Two parallel links 66 are pivoted on a frame 67 and supplied at their free ends with a cross link 68 having an arm 69, which is at all times maintained in position parallel to the plungers 59 of the elevator. This arm 69 has slot 70 therein to receive a pin 71 joining the arms 65 of the carrier. One of the links 66 is connected with a crank 72 mounted in the frame 67. The crank-pin 73 on said crank rests in a cam slide 74 in a cam 75 on the power shaft 45. Said crank being rocked by the cam 75 and acting through the links 66 causes the arms 65 to be reciprocated in the bearing 61. The ends of the arms 65 adjacent to the drum A are joined by spacers 76. A rock-shaft 77 journaled near its ends in these spacers, extends longitudinally between the arms 65. Said arms are spaced so that the distance between the axes thereof is equal to the distance between the centers of the rows of molds in each battery of molds. Depending from the arms 65 and at intervals equal to the distance between the centers of each pair of molds 10 are the grips $d$. Each grip comprises a pair of spring wires 78 passing through its supporting arm and secured to the upper arch thereof. The free ends of said wires 78 are turned outward in opposite directions, then upward to receive curved plates 79, which are pivoted on said upwardly projecting portions and have on their outer surfaces, upwardly projecting barbs 80. These wires 78 are so mounted in the arms 65 that they will normally rest in separated or expanded positions (Fig. 8), the bodies thereof bearing against segment bars 81 inserted between the inner walls of said arms and said wires. Arms 82 on the rock shaft 77 are connected through links 83 with the ends of said segment bars 81 and a lever 84 on said shaft, arranged to strike and be actuated by an adjustable stop 85 on the bearing 60, turns the rock shaft to compress the spring wires 78 and cross the same as shown in Fig. 10. A tension spring 86 stretched between the lever 84 and one of the spacers 76 operates, in the absence of resistance, to swing the lever 84 thus shifting the segment bars 81 to original position against the fixed ends of said wires 78 (Fig. 9) and permitting the members of each grip to expand. The cam 75 is formed to advance the carrier $c$ to position above the drum A and return the same to position shown in Fig. 1. The cam 64 is formed and timed to first lower the grips $d$ within the cones to be extracted and then lift said grips from the molds, while the drum A is stationary. The grips $d$ adjust themselves to the inner peripheries of the cones, when inserted therein, but are compressed to release said cones, when the lever 84 on the rock shaft 77 strikes the stop 85. This stop is arranged so that the cones may be released at any elevation desired. Suitable receptacles such as tubes 87, may be supplied to receive the cones. The stop 85 is shown at a position permitting the insertion of the cone tips into said tubes, prior to the releasing thereof by the grips $d$. From the above, it will be seen that the grips $d$ are moved over the drum A, lowered into the baked cones, raised to lift the same from the molds, withdrawn to positions above the tubes 87, lowered to insert the tips of said cones into the tubes, compressed to release the cones and finally returned to initial position.

Changes in the specific form of my invention, as herein disclosed, may be made within the scope of what is claimed without departing from the spirit of my invention.

Having described my invention, what I claim as new and desire to protect by Letters Patent is:

1. In a device of the class described, a mold, a support, a core threaded in said support and designed to seat thereagainst, said core being adapted to register with the mold to form a hollow pastry cone, means for heating the mold, actuating means connected with the core for turning the same to unseat and free it from the pastry and independent actuating means also connected with said core to turn the same in a counter direction and reseat it in said support.

2. In a device of the class described, a battery of molds, a battery of cores for said molds, a core supporting member in which said molds are revolubly mounted, the rotation of said cores operating, in one direction to withdraw the same from the molds and, in the other direction, to return said cores, means for heating the molds, an actuating device connected with the cores and adapted to turn them in the direction resulting in their withdrawal from molding positions and individual actuating devices connected with said cores for severally and independently turning the same to restore them to molding positions.

3. In a device of the class described, a mold, a support, a core threaded in said support, a stop in the support for the core, said core being adapted to register with the mold and when placed against said stop to form a hollow pastry cone, means for heating the contents of said mold, positive actuating mechanism for turning the core to remove it from said stop and slightly withdraw and free the same from the pastry and yielding means to rotate said core in a counter direction and thus return the same to initial position against said stop.

4. In a device of the kind described, a mold, a core, a core support, said core being adapted to enter the mold to form a hollow pastry cone, means for heating the mold, means connected with the core for shifting the same longitudinally in said support in a direction slightly withdrawing it from said mold to thereby free the same from the pastry and other means connected with the core for yieldingly returning it to initial position with respect to said support.

5. In a device of the class described, a battery of molds, a battery of companion cores, a core supporting bar, internally threaded bushings adjustably secured on said bar, said cores being threaded in said bushings and designed to be seated with respect to said supporting bar and being also designed to register with said molds and, when seated, to form hollow pastry cones, means for heating the molds, means for turning said cores to unseat the same and free them from the baked pastry and separate and distinct mechanism for individually turning said cores in the opposite direction to reseat the same.

6. In a device of the class described, a battery of molds, a battery of cores for said molds, a core supporting bar into which said cores are threaded and adapted to seat, said cores being designed to register with said molds to form hollow pastry cones, means for heating the molds, a wire for each core, attached to one side thereof, a pulling device connected with said wires and adapted to turn said cores, collectively, and thereby slightly withdraw the same from the molds, a second wire for each mold, attached thereto at the side opposite said first wire and individual yielding devices connected with each wire for severally and independently turning said cores to reseat the same in molding positions.

7. In a device of the class described, a battery of molds, a battery of companion cores, a core supporting bar into which said cores are threaded and adapted to seat, said cores being designed to register with said molds and, when seated in the core supporting bar, to form hollow pastry cones, means for heating the contents of the molds, means for turning said cores to unseat the same and free them from the baked pastry and other mechanism for individually turning said cores in the opposite direction and reseating the same in the core supporting bar.

8. In a device of the class described, a battery of molds, a battery of threaded cores for said molds, a core supporting bar, threaded bushings adjustably secured in the supporting bar and designed to receive the cores, said cores being adapted to seat against said bar and register with said molds to form hollow pastry cones, means for heating the molds, a wire for each core, attached to one side thereof, a pulling device connected with said wires and adapted to turn said cores, collectively, and thereby slightly withdraw the same from the molds, a second wire for each mold, attached thereto at the side opposite said first wire and individual yielding devices connected with each wire for severally and independently turning said cores to reseat the same in molding positions.

9. In a device of the class described, a mold, a support, an internally threaded bushing adjustably secured within the support, a core threaded in said bushing and designed to be seated against said support, said core being adapted to register with said mold to form a hollow pastry cone, means for heating the mold, means for turning the core to unseat and free the same from the pastry and independent means to turn said core in a counter direction and reseat said core in said support.

10. In a device of the class described, a mold, a support, an internally threaded bearing, a core threaded in the bearing, a stop to limit the turning movement of said core in one direction, said bearing being adjustably fixed with respect to said support, said core being adapted to register with the mold to form a hollow pastry cone, means for heating the mold, means attached to one side of the core for turning the same to remove it from said stop and free said core from the pastry and independent means attached to the opposite side of the core to turn the same in a counter direction and reengage said core with said stop.

11. The combination with a mold, a core removable from said mold and adapted, when inserted therein, to form a hollow pastry cone and means for heating the mold, of a carrier, a yielding grip supported thereon and comprising a plurality of self expanding members adapted to adjust themselves to the inner peripheries of cones, means for shifting the carrier to direct the grip into a cone within the mold, then remove the same from said mold, and mechanism to compress the yielding members of the grip, whereby the cone is released from the grip.

12. In a device of the class described, a battery of molds, a battery of companion cores, a core supporting bar into which said cores are threaded and adapted to seat, said cores being designed to register with said molds and, when seated in the core supporting bar, to form hollow pastry cones, means for heating the contents of the molds, means for turning said cores to unseat the same and free them from the baked pastry and yielding mechanism for individually turning said cores in the opposite direction and reseating the same in the core supporting bar.

13. In a device of the class described, a vertically revoluble drum having batteries of molds in the periphery thereof, oscillatory arms carried with said drum, a core plate on each of said arms, a battery of cores threaded and designed to seat in each core plate, said cores being adapted to register with said molds to form hollow pastry cones, means for heating the molds, means for rotating the drum, step by step, yielding means to secure the core plates against the drum, mechanism to release said yielding means, means for temporarily raising the core plates from the drum to effect a releasing movement between the pastry cones and molds, means for turning and thereby raising the cores to effect a releasing movement between the pastry cones and said cores, means for lifting the arms to remove the cores from the molds and for lowering said arms to again register said cores with said molds, means for turning said cores to reseat the same in said plates, preparatory to the lowering of said arms and means for thereafter reengaging said yielding means with said core plates.

14. In a device of the class described, a vertically revoluble drum-like oven having batteries of molds in the periphery thereof, oscillatory arms carried with said oven, a core plate on each of said arms, a battery of cores movable longitudinally in each core plate, said cores being adapted to register with said molds to form hollow pastry cones, means for heating the interior of said oven, means for rotating the oven, means for temporarily lifting the core plates from the oven to effect a releasing movement between the pastry cones and molds, means for lifting the cores in said plates to effect a releasing movement between the pastry cones and said cores, means for lifting the arms to remove the cores from the molds and for lowering said arms to again register said cores with said molds and means for depressing said cores in said plates, preparatory to the lowering of said arms.

15. In a device of the class described, a mold, an oscillatory support, a core threaded in said support and adapted to seat thereagainst, said core being adapted to enter the mold to form a hollow pastry cone, means for applying heat to the molds, means for swinging the support to slightly lift the same and thereby overcome the sticking of the baked pastry against the mold, said support being adapted to thereafter return and replace the core in molding position, means for subsequently turning the core within the support to unseat the same and overcome the sticking of the baked pastry against the core and means for swinging the support to entirely remove the core from said mold.

16. In a device of the class described, a mold, an oscillatory support, a core threaded in said support and adapted to seat thereagainst, said core being adapted to enter the mold to form a hollow pastry cone, means for applying heat to the mold, means for swinging the support to slightly lift the same and thereby overcome the sticking of the baked pastry against the mold, said support being adapted to thereafter return and replace the core in molding position, means for subsequently turning the core within the support to unseat the same and overcome the sticking of the baked pastry against the core, means for swinging the support to entirely remove the core from said mold, and means for reseating the core preparatory to the return movement of said support to again cause the core to enter the mold.

17. In a device of the class described, a battery of molds, a battery of cores for said molds, a core supporting bar into which said cores are threaded and adapted to seat, said cores being designed to register with said molds to form hollow pastry cones, means for heating molds, a pulling device connected with said cores and adapted to turn the same collectively and thereby slightly withdraw them from the molds, a wire for each mold attached thereto at the side opposite the pulling device, and an individual yielding device connected with each wire for severally and independently turning said cores to reseat the same in molding positions.

18. In a device of the class described, a battery of molds, a battery of cores for said molds, a core supporting bar into which said cores are threaded and adapted to seat, said cores being arranged in two parallel rows, the cores in one row being threaded oppositely with respect to the cores in the other row, all of said cores being designed to register with their respective mold members to form hollow pastry cones, means for heating the molds, a pulling device extending between the rows of cores and attached to adjacent sides thereof, said device being adapted to turn the cores collectively and thereby slightly withdrawing the same from the molds, a wire for each mold attached thereto to the side opposite said pulling device and individual yielding means connected with each wire for severally and individually turning said cores to reseat the same in molding positions.

In testimony whereof, I have signed my name to this specification.

FREDERICK A. OST.